United States Patent
Kojima et al.

(10) Patent No.: US 8,940,084 B2
(45) Date of Patent: Jan. 27, 2015

(54) GAS ADSORBING DEVICE AND VACUUM INSULATION PANEL PROVIDED WITH SAME

(75) Inventors: Shinya Kojima, Kyoto (JP); Masahiro Koshiyama, Kyoto (JP); Masamichi Hashida, Shiga (JP); Asaaki Yasuda, Shiga (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/983,503

(22) PCT Filed: Feb. 1, 2012

(86) PCT No.: PCT/JP2012/000676
§ 371 (c)(1),
(2), (4) Date: Aug. 2, 2013

(87) PCT Pub. No.: WO2012/111267
PCT Pub. Date: Aug. 23, 2012

(65) Prior Publication Data
US 2013/0305928 A1 Nov. 21, 2013

(30) Foreign Application Priority Data

Feb. 14, 2011 (JP) .................................. 2011-028214
Apr. 6, 2011 (JP) .................................. 2011-084277
Apr. 6, 2011 (JP) .................................. 2011-084278

(51) Int. Cl.
*B01D 53/02* (2006.01)
*H01J 7/18* (2006.01)
*B01D 53/04* (2006.01)

(52) U.S. Cl.
CPC .. *B01D 53/0407* (2013.01); *B01D 2255/20761* (2013.01); *H01J 7/186* (2013.01); *B01D 2257/104* (2013.01); *B01D 2257/80* (2013.01); *B01D 2253/1122* (2013.01); *B01D 2251/302* (2013.01); *B01D 2253/108* (2013.01); *B01D 2257/102* (2013.01)
USPC .............. 96/149; 96/9; 95/90; 95/95; 95/101; 95/102; 55/359

(58) Field of Classification Search
USPC .......... 95/90, 95, 101, 102; 96/9, 149; 55/359
See application file for complete search history.

(56) References Cited

U.S. PATENT DOCUMENTS

| 4,726,974 A | 2/1988 | Nowobilski et al. |
| 5,091,233 A | 2/1992 | Kirby et al. |

(Continued)

FOREIGN PATENT DOCUMENTS

| EP | 2399661 | 12/2011 |
| JP | 61-066070 | 4/1986 |

(Continued)

*Primary Examiner* — Christopher P Jones
(74) *Attorney, Agent, or Firm* — Hamre, Schumann, Mueller & Larson, P.C.

(57) ABSTRACT

A gas adsorbing device (5a) according to the present invention includes a gas adsorbing material (9) that adsorbs at least nitrogen and a housing container (11) that has a long, thin, flat, tubular shape and is made of metal and in which both sides of a housing portion (10) configured to house the gas adsorbing material (9) under reduced pressure are sealed. A contact portion (13) where opposing inner surfaces of the housing container (11) are in close contact with each other is located between at least one of seal portions (12a and 12b) of the housing container (11) and the housing portion (10).

10 Claims, 15 Drawing Sheets

(56) References Cited

U.S. PATENT DOCUMENTS

| | | | |
|---|---|---|---|
| 5,312,606 A | 5/1994 | Boffito et al. | |
| 5,544,490 A | 8/1996 | Manini et al. | |
| 5,551,557 A * | 9/1996 | Brooks et al. | 206/205 |
| 8,333,279 B2 * | 12/2012 | Veiseh | 206/524.8 |
| 2009/0007789 A1 | 1/2009 | Hirai et al. | |
| 2009/0090242 A1 * | 4/2009 | Hashida et al. | 95/101 |
| 2012/0006195 A1 | 1/2012 | Hashida | |
| 2013/0008309 A1 * | 1/2013 | Hashida | 95/90 |
| 2013/0306655 A1 | 11/2013 | Takushima et al. | |

FOREIGN PATENT DOCUMENTS

| | | |
|---|---|---|
| JP | 61-116269 | 6/1986 |
| JP | 63-187084 | 8/1988 |
| JP | 63-279081 | 11/1988 |
| JP | H5-131134 | 5/1993 |
| JP | H07-269780 | 10/1995 |
| JP | 3105542 B | 9/2000 |
| JP | 2003-311148 | 11/2003 |
| JP | 2004-116695 | 4/2004 |
| JP | 2005-315310 | 11/2005 |
| JP | 2006-43604 | 2/2006 |
| JP | 3811963 B | 6/2006 |
| JP | 2006-242497 | 9/2006 |
| JP | 2008-045580 | 2/2008 |
| WO | WO 2006/080416 | 8/2006 |
| WO | WO 2010/109846 | 9/2010 |
| WO | WO 2011/145481 | 11/2011 |

* cited by examiner

US 8,940,084 B2

GAS ADSORBING DEVICE AND VACUUM INSULATION PANEL PROVIDED WITH SAME

TECHNICAL FIELD

The present invention relates to a gas adsorbing device and a vacuum insulation panel provided with the same.

BACKGROUND ART

Nowadays, an energy-saving promotion becomes increasingly active as a countermeasure against global warming that is one global environmental problem. Particularly, as to heating and cooling devices, a vacuum insulation panel having an excellent heat insulating performance is becoming increasingly common from the viewpoint of efficient use of heat. The vacuum insulation panel is formed such that: a core material, such as glass wool, which has a high gas-phase volume ratio to form fine air gaps, is housed in a gas barrier laminate film formed into a pouched shape; and the laminate film is sealed under reduced pressure. An air gap diameter of the core material is reduced smaller than a mean free path of a gas molecule under reduced pressure, which decreases a gas heat conduction component of the vacuum insulation panel. Particularly, an influence of a convection heat transfer component is negligible in the case that the air gap diameter is as extremely small as about 1 mm. Additionally, because an influence of a radiation component is extremely low around room temperature, a solid heat conduction component of the core material and the slightly remaining gas heat conduction component become dominant as the heat conduction component in the vacuum insulation panel. Therefore, the thermal conductivity of the vacuum insulation panel is considered to be extremely lower than that of other heat insulation panels.

However, when air invades gradually into the vacuum insulation panel through the laminate film, unfortunately the gas heat conduction component increases to gradually increase a thermal conductivity of the vacuum insulation panel. Here, proposed as a solution to this problem is that a gas adsorbing device as a component of a vacuum insulation panel is sealed together with a core material under reduced pressure, the gas adsorbing device being configured to store a desiccant and a Ba—Li alloy getter in an open-top container, made of a gas impermeable material, to form such a two-layer structure that the desiccant is located on an open portion side of the open-top container, and the Ba—Li alloy getter material is located on a seal portion side of the open-top container (see PTL 1, for example).

FIG. 13 is a longitudinal sectional view showing a gas adsorbing device of Conventional Example 1 disclosed in PTL 1. As shown in FIG. 13, a gas adsorbing device 21 of Conventional Example 1 includes: an open-top container 22 made of the gas impermeable material; a first pellet 23 made from powders of the Ba—Li alloy getter material by compression at pressures of about 30 to 1,000 bar and housed in a lower portion of the open-top container 22; and a second pellet 24 made from desiccant powders and housed in an upper portion of the open-top container 22 so as to completely cover the first pellet 23 from above (from the open portion side of the open-top container 22).

In the vacuum insulation panel in which the gas adsorbing device 21 of Conventional Example 1 is sealed together with the core material under reduced pressure, water (steam) in air that has entered the vacuum insulation panel is adsorbed when the air flows from the open portion of the open-top container 22 through the second pellet 24. Then, the air whose water (steam) has been adsorbed by the second pellet 24 flows to the first pellet 23 to be adsorbed by the first pellet 23.

As above, the gas adsorbing device 21 of Conventional Example 1 is configured such that the second pellet 24 constituted by the desiccant covers the first pellet 23 constituted by the Ba—Li alloy getter material from the open portion side of the open-top container 22. With this configuration, it is possible to suppress a phenomenon in which the getter material constituting the first pellet 23 adsorbs the water (steam) in the air, and this deteriorates an air adsorbing performance of the getter material soon. Therefore, the degree of vacuum in the vacuum insulation panel is considered to be able to be maintained.

In addition, proposed as another solution to the above problem is that a gas adsorbing device configured such that a gas adsorbing material is sealed under reduced pressure in a hardly-gas-permeable container is sealed under reduced pressure as a component of the vacuum insulation panel together with the core material, and the hardly-gas-permeable container is then opened (see PTL 2, for example).

FIG. 14 is a side view of a gas adsorbing device of Conventional Example 2 disclosed in PTL 2 when viewed from a direction perpendicular to both a longitudinal direction and thickness direction of the gas adsorbing device. FIG. 15 is a side view of the gas adsorbing device of Conventional Example 2 disclosed in PTL 2 when viewed from an aperture sealed with a sealing material.

As shown in FIGS. 14 and 15, a gas adsorbing device 25 of Conventional Example 2 is produced by the following producing method. First, a hardly-gas-permeable container 26 constituted by a hollow bottomed tubular metal member is prepared. The hardly-gas-permeable container 26 has one end that opens and the other end that is sealed, and a length of a body portion thereof extending from the one end to the other end is at least a larger one of the width of the one end and the width of the other end. Next, a gas adsorbing material 29 is filled in the hardly-gas-permeable container 26 through an aperture 27 of the hardly-gas-permeable container 26. Next, a narrow portion 26a where inner surfaces of the hardly-gas-permeable container 26 are located close to each other is formed in the vicinity of the aperture 27. Next, a sealing material 28 is provided at the narrow portion 26a. While reducing the pressure of the inside of the hardly-gas-permeable container 26 and the pressure of a space around the hardly-gas-permeable container 26, the sealing material 28 and the vicinity of the aperture 27 are heated such that the sealing material 28 melts to close a gap of the narrow portion 26a. The melted sealing material 28 having closed the gap of the narrow portion 26a is cooled down to be solidified. As a result, the vicinity of the aperture 27 (the gap of the narrow portion 26a) is sealed.

The gas adsorbing device 25 of Conventional Example 2 produced through the above steps is considered to be applicable to a device, such as a vacuum insulation panel, which is required to maintain the vacuum without causing the gas adsorbing material 29 to contact the air.

CITATION LIST

Patent Literature

PTL 1: Japanese Patent No. 3105542
PTL 2: International Publication No. 2010/109846

SUMMARY OF INVENTION

Technical Problem

According to the configuration of the gas adsorbing device 21 of Conventional Example 1 shown in FIG. 13, the Ba—Li alloy getter material constituting the first pellet 23 is highly compatible with steam (water in the air). Therefore, before the air containing a mixture gas of oxygen, nitrogen, and the like contacts the first pellet 23 (the Ba—Li alloy getter material), the steam (water in the air) needs to be completely removed from the air. Therefore, the utility is low if there is only the first pellet 23 (the Ba—Li alloy getter material), and there is no choice but to adopt the configuration of the two-layer structure in which the second pellet 24 constituted by the desiccant covers the first pellet 23 (the Ba—Li alloy getter material) from the open portion side of the open-top container 22.

Further, in the case of using the gas adsorbing device 21 of Conventional Example 1, the adsorption of nitrogen and the like starts immediately after the gas adsorbing device 21 of Conventional Example 1 is exposed to the air. Therefore, there is a problem that the adsorption performance of the conventional gas adsorbing device 21 gradually deteriorates for a period until the gas adsorbing device 21 of Conventional Example 1 is housed in the device, such as the vacuum insulation panel, which is required to maintain the vacuum.

According to the configuration of the gas adsorbing device 25 of Conventional Example 2, the gas adsorbing material 29 housed in the hardly-gas-permeable container 26 is sealed with the sealing material 28. Therefore, without exposing the gas adsorbing material 29 to the air, the gas adsorbing material 29 can be housed in the device, such as the vacuum insulation panel, which is required to maintain the vacuum. However, it is difficult to determine whether or not the gas adsorbing material 29 is surely sealed with the sealing material 28. Therefore, there is a possibility that the gas adsorbing device 25 of Conventional Example 2 in which the sealing with the sealing material 28 is incomplete, and the gas adsorption performance is unstable is housed in the device that is required to maintain the vacuum.

In addition, according to the configuration of the gas adsorbing device 25 of Conventional Example 2, in order that the gas adsorbing material 29 filled in the hardly-gas-permeable container 26 is subjected to the heat treatment under a reduced pressure and high temperature atmosphere in a vacuum heating furnace, there is no choice but to perform a method of heating the gas adsorbing material 29 by heat transfer from the hardly-gas-permeable container 26 to the gas adsorbing material 29. Therefore, the heat is not uniformly transferred to the gas adsorbing material 29, so that temperature irregularity occurs. Thus, the heat treatment is not uniformly performed. That is, there is a problem that the gas adsorption performance of the gas adsorbing material 29 is unstable.

Further, according to the configuration of the conventional gas adsorbing device 25, there is a problem that it requires a long period of time to perform the heat treatment of the gas adsorbing material 29 under a reduced pressure and high temperature atmosphere in the vacuum heating furnace, the gas adsorbing material 29 being filled in the hardly-gas-permeable container 26.

Solution to Problem

To solve the above problems, a gas adsorbing device according to an aspect of the present invention includes: a gas adsorbing material that adsorbs nitrogen; and a housing container configured to have a long, thin, flat, tubular shape and house the gas adsorbing material under reduced pressure, and made of metal, wherein the housing container includes: a housing portion configured to house the gas adsorbing material; seal portions configured to respectively seal both sides of the housing portion; and a contact portion located between at least one of the seal portions of the housing container and the housing portion and configured such that opposing inner surfaces of the housing container are in close contact with each other.

According to the above configuration, since both ends of the housing container are sealed, the airtightness of the housing container is being secured. In a case where the airtightness of the housing container is not being secured (the sealing of the housing container is incomplete), the pressure difference between the inside and outside of the housing container is little. Therefore, the contact force between the gas adsorbing material and the housing container by the pressure difference between the inside and outside of the housing container is lost. In other words, in a case where the airtightness of the housing container is being secured, the gas adsorbing material is housed in the housing container so as to be in close contact with the inner surface of the housing container by the pressure difference between the inside and outside of the housing container.

As above, since the airtightness of the housing container is secured, the gas adsorption performance is maintained, and in addition, the air as a medium that causes the vibrations of the gas adsorbing material is prevented from flowing into the housing container, and the gas adsorbing material is housed in the housing portion so as to be in close contact with the inner surface of the housing container such that the vibrations of the gas adsorbing material in the housing portion are suppressed. Therefore, in a case where excitation is applied to the gas adsorbing device, as compared to the gas adsorbing device in which the airtightness of the housing container is not being secured (the sealing of the housing container is incomplete), the vibrations of the gas adsorbing material in the housing portion are suppressed, the natural frequency of the gas adsorbing device changes (decreases), and the sounds corresponding to the change in the natural frequency are generated. To be specific, by the difference of the sounds generated when the excitation is applied to the gas adsorbing device, whether or not the airtightness of the housing container is being secured, that is, the sealed state under reduced pressure (whether or not the gas adsorption performance is being maintained) can be easily confirmed.

According to the above configuration, since the contact portion is a depressed portion that is depressed from the housing portion in the housing container, the sounds are amplified by the depressed portion. In a case where the airtightness of the housing container is being secured, the contact force between the inner surfaces of the housing container at the contact portion is maintained. However, in a case where the airtightness of the housing container is not being secured, the contact force between the inner surfaces of the housing container at the contact portion by the pressure difference between the inside and outside of the housing container is lost. Therefore, the tendency of the vibrations of the gas adsorbing material changes depending on the change in the state of the contact portion corresponding to whether or not the airtightness of the housing container is being secured. That is, according to the above configuration, as compared to a case where the contact portion is not formed, the difference of the sounds generated when the excitation is applied to the gas adsorbing device becomes clearer. Thus, the sealed state under reduced pressure can be confirmed more easily.

As above, by confirming the difference of the sounds generated when the excitation is applied to the gas adsorbing device, it is possible to perform screening of the gas adsorbing device in which the sealing with the sealing material is incomplete, and the gas adsorption performance is unstable. Thus, only the gas adsorbing device having the stable gas adsorption performance can be housed in the device, such as the vacuum insulation panel, which is required to maintain the vacuum.

To solve the above problems, in the gas adsorbing device according to another aspect of the present invention, in order that the temperature irregularity of the gas adsorbing material in the housing container is reduced by the heat transfer from the heat transfer member, the heat transfer member that is higher in the heat-transfer performance than the gas adsorbing material in the housing container is provided such that: the entire gas adsorbing material in the housing container is located within a predetermined distance from the heat transfer member, the predetermined distance being shorter than a maximum distance between a central axis of the housing container and the inner surface of the housing container; and the heat transfer member contacts the gas adsorbing material in the housing container.

According to the above configuration, when the gas adsorbing material transfers the heat, transferred from the inner surface of the housing container, to the heat transfer member in a reduced pressure and high temperature atmosphere, the heat transfer member that is higher in the heat-transfer performance than the gas adsorbing material transfers the heat to the entire heat transfer member. Thus, the temperature of the entire surface of the heat transfer member becomes substantially uniform, so that the temperature of the gas adsorbing material contacting the heat transfer member also becomes substantially uniform. In addition, the entire gas adsorbing material in the housing container is located within a predetermined distance from the heat transfer member, the predetermined distance being shorter than the maximum distance between the central axis of the housing container and the inner surface of the housing container. Thus, the temperature irregularity of the gas adsorbing material can be reduced, and the gas adsorbing material in the housing container can be subjected to the heat treatment substantially uniformly.

To solve the above problems, in the gas adsorbing device according to still another aspect of the present invention, in order that the heating of the gas adsorbing material in the housing container is accelerated by the heat transfer from the heat transfer member while the housing container is being heated, the heat transfer member that is higher in the heat-transfer performance than the gas adsorbing material in the housing container is provided such that: the heat transfer member contacts the gas adsorbing material; and at least a part of the heat transfer member is exposed from the gas adsorbing material in the housing container.

According to the above configuration, radiation heat received from the housing container by the part, exposed from the gas adsorbing material in the housing container, of the heat transfer member that is higher in the heat-transfer performance than the gas adsorbing material is transferred to the gas adsorbing material through a portion, contacting the gas adsorbing material, of the heat transfer member. Therefore, the heat can be transferred to the gas adsorbing material in a short period of time, and the temperature irregularity of the gas adsorbing material in the vicinity of a portion, contacting the gas adsorbing material, of the heat transfer member can be reduced.

In consideration of the above problems, an object of the present invention is to appropriately provide a gas adsorbing device having a stable gas adsorption performance and a vacuum insulation panel including the gas adsorbing device. Specifically, an object of the present invention is to provide the gas adsorbing device whose sealed state under reduced pressure can be easily confirmed. Another object of the present invention is to provide the gas adsorbing device in which a gas adsorbing material in a housing container can be subjected to a heat treatment substantially uniformly even in a reduced pressure and high temperature atmosphere as in a vacuum heating furnace. Still another object of the present invention is to provide the gas adsorbing device in which a time required to perform the heat treatment of the gas adsorbing material in the housing container can be shortened even in a reduced pressure and high temperature atmosphere as in the vacuum heating furnace.

The above objects, other objects, features, and advantages of the present invention will be made clear by the following detailed explanation of preferred embodiments with reference to the attached drawings.

Advantageous Effects of Invention

According to the present invention, it is possible to appropriately provide the gas adsorbing device having the stable gas adsorption performance. Specifically, according to the gas adsorbing device of the present invention, the sealed state under reduced pressure can be easily confirmed by a simple method of applying excitation. With this, it is possible to perform screening of the gas adsorbing device in which the sealing with the sealing material is incomplete, and the gas adsorption performance is unstable. Thus, only the gas adsorbing device having the stable gas adsorption performance can be housed in the device, such as the vacuum insulation panel, which is required to maintain the vacuum. In addition, according to the gas adsorbing device of the present invention, even in the case of performing the heat treatment in a reduced pressure and high temperature atmosphere, by the existence of the heat transfer member, the temperature irregularity of the gas adsorbing material can be reduced, and the gas adsorbing material in the housing container can be subjected to the heat treatment substantially uniformly. Thus, the gas adsorption performance can be stabilized. Further, according to the gas adsorbing device of the present invention, even in the case of performing the heat treatment in a reduced pressure and high temperature atmosphere, a time required to perform the heat treatment of the gas adsorbing material in the housing container can be shortened by the existence of the heat transfer member.

DESCRIPTION OF EMBODIMENTS

Figure 1:
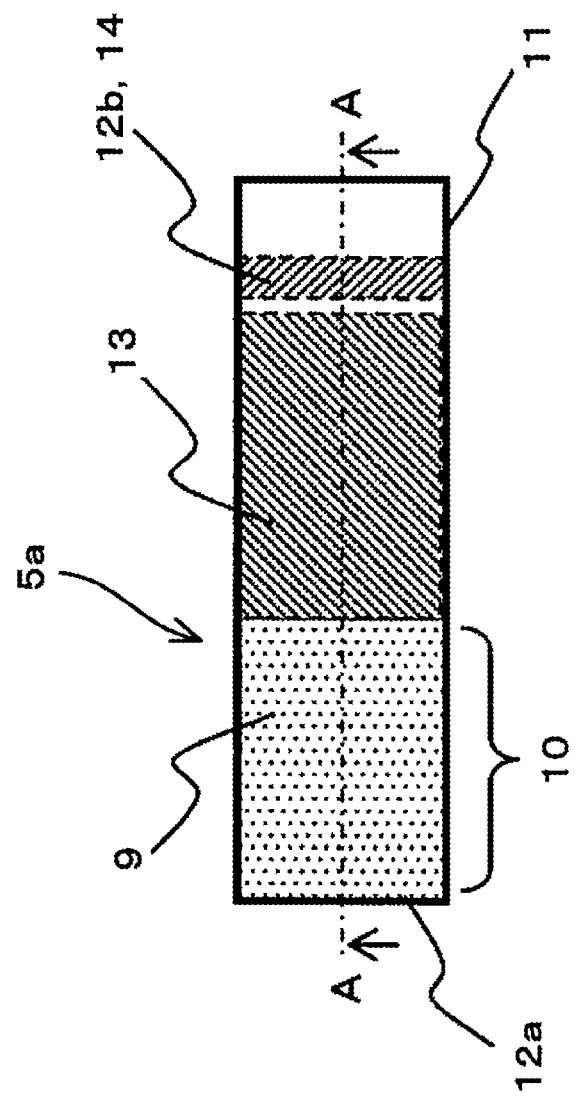
FIG. 1 is a plan view showing a configuration example of a gas adsorbing device of Embodiment 1 of the present invention.

Hereinafter, embodiments of the present invention will be explained in reference to the drawings. In the following explanations and drawings, the same reference signs are used for the same or corresponding components, and a repetition of the same explanation is avoided if the component is not especially mentioned.

A first aspect of the present invention is a gas adsorbing device including: a gas adsorbing material that adsorbs nitrogen; and a housing container configured to have a long, thin, flat, tubular shape and house the gas adsorbing material under reduced pressure, and made of metal, wherein the housing container includes: a housing portion configured to house the gas adsorbing material; seal portions configured to respectively seal both sides of the housing portion; and a contact portion located between at least one of the seal portions of the housing container and the housing portion and configured such that opposing inner surfaces of the housing container are in close contact with each other.

In the present invention, the "gas adsorbing material" is a material having an ability to adsorb nitrogen and oxygen in air. The type of the gas adsorbing material is not especially specified. A lithium compound or copper ion-exchanged ZSM-5 zeolite may be used as the gas adsorbing material.

The "housing container" serves to house the gas adsorbing material under reduced pressure and form the contact portion at the gas adsorbing device. The type of the housing container is not especially specified. Aluminum, copper, iron, stainless steel, or the like may be used as the material of the housing container. Further, to easily form the contact portion, it is desirable that the housing container be subjected to annealing. From the viewpoint of formability and cost, it is further desirable that the housing container be made of aluminum having a thickness of less than 0.5 mm.

The "sealing" is a method of maintaining a reduced pressure state in the housing container. For example, it is possible to utilize a method of filling an adhesive member, such as brazing filler metal, adhesive, or glass, in the inner surfaces of the housing container, a method of causing the opposing inner surfaces of the housing container to be joined to each other using high frequency welding, ultrasonic welding, or the like, or a method of forming a bottom such that the inner surfaces of the housing container becomes continuous with each other by impact press or deep drawing.

According to the above configuration, the gas adsorbing material is housed in the housing container so as to be in close contact with the inner surface of the housing container. Therefore, the vibrations of the gas adsorbing material when excitation is applied to the gas adsorbing device are suppressed. As compared to the gas adsorbing device configured such that the gas adsorbing material is housed in the housing container so as not to be in close contact with the inner surface of the housing container, the natural frequency changes, and the sounds corresponding to the change in the natural frequency are generated. The contact portion becomes a depression of the gas adsorbing device, and the sounds are amplified by the depression.

In a case where the sealing with the sealing material is incomplete, the pressure difference between the inside and outside of the housing container is little. Therefore, the contact force between the gas adsorbing material and the housing container by the pressure difference between the inside and outside of the housing container and the contact force between the inner surfaces of the housing container at the contact portion by the pressure difference between the inside and outside of the housing container are lost. On this account, the sounds generated when the excitation is applied to the gas adsorbing device are clearly different from those in a case where the sealing with the sealing material is complete.

Thus, according to the gas adsorbing device of the present invention, the sealed state under reduced pressure can be easily confirmed by the sounds generated when the excitation is applied to the gas adsorbing device.

According to the above configuration, since the contact portion is a depressed portion that is depressed from the housing portion in the housing container, the sounds are amplified by the depressed portion. In a case where the airtightness of the housing container is being secured, the contact force between the inner surfaces of the housing container at the contact portion is maintained. However, in a case where the airtightness of the housing container is not being secured, the contact force between the inner surfaces of the housing container at the contact portion by the pressure difference between the inside and outside of the housing container is lost. Therefore, the tendency of the vibrations of the gas adsorbing material changes depending on the change in the state of the contact portion corresponding to whether or not the airtightness of the housing container is being secured. That is, according to the above configuration, as compared to a case where the contact portion is not formed, the difference of the sounds generated when the excitation is applied to the gas adsorbing device becomes clearer. Thus, the sealed state under reduced pressure can be confirmed more easily.

Then, by confirming the sealed state under reduced pressure as above, it is possible to perform screening of the gas adsorbing device in which the sealing with the sealing material is incomplete, and the gas adsorption performance is unstable. Thus, only the gas adsorbing device having the stable gas adsorption performance can be housed in a device, such as the vacuum insulation panel, which is required to maintain the vacuum.

A second aspect of the present invention is configured such that especially in the first aspect of the present invention, at least one of two opposing flat surfaces of the housing container includes a depressed portion that is depressed from the housing portion.

According to the above configuration, since the depressed portion is formed at the housing container, an effect in which the sounds easily echo is obtained in addition to the effect of the first aspect of the present invention. Examples of the method of forming the depressed portion at the housing container include a method of forming the gas adsorbing material in a depressed shape and sealing the housing container under reduced pressure such that the shape of the housing container corresponds to the shape of the gas adsorbing material and a method of performing molding such that the depressed portion is formed at the housing container in advance. A method of forming the contact portion at the housing container having a substantially uniform thickness and utilizing the contact portion as the depressed portion is simple and easy.

A third aspect of the present invention is configured such that especially in the first or second aspect of the present invention, a thin portion that is thinnest in a cutting surface perpendicular to a longitudinal direction of the housing container is a cutting surface of the contact portion.

According to the above configuration, since a thin portion that is the thinnest in the cutting surface perpendicular to the longitudinal direction of the housing container is the cutting surface of the contact portion, an effect in which the sounds echo more is obtained in addition to the effect of the first or second aspect of the present invention.

A fourth aspect of the present invention is configured such that especially in the first to third aspects of the present invention, when an internal space of the housing container is caused to communicate with an outside of the housing container, the contact portion expands, so that a space is formed between the inner surfaces of the housing container at the contact portion.

According to the above configuration, when the internal space of the housing container is caused to communicate with the outside of the housing container, the contact portion expands, so that the space is formed between the inner surfaces of the housing container at the contact portion. Therefore, the difference of the sounds generated when the excitation is applied to the gas adsorbing device becomes clearer between a case where the sealing with the sealing material is complete and a case where it is incomplete.

A fifth aspect of the present invention is configured such that especially in the first to fourth aspects of the present invention, a heat transfer member that is higher in a heat-transfer performance than the gas adsorbing material is provided such that: the heat transfer member does not contact the opposing inner surfaces of the housing container; and the gas adsorbing material is interposed between each of both surfaces of the heat transfer member and the inner surface of the housing container.

A sixth aspect of the present invention is configured such that especially in the fifth aspect of the present invention, the gas adsorbing material is a material whose air adsorbing performance improves by a heat treatment, the entire gas adsorbing material in the housing container is located within a predetermined distance from the heat transfer member, the predetermined distance being shorter than a maximum distance between a central axis of the housing container and the inner surface of the housing container, and the heat transfer member is provided so as to contact the gas adsorbing material in the housing container.

According to the above configuration, when the gas adsorbing material transfers the heat, transferred from the inner surface of the housing container, to the heat transfer member in a reduced pressure and high temperature atmosphere, the heat transfer member that is higher in the heat-transfer performance than the gas adsorbing material transfers the heat to the entire heat transfer member. Thus, the temperature of the entire surface of the heat transfer member becomes substantially uniform, so that the temperature of the gas adsorbing material contacting the heat transfer member also becomes substantially uniform. In addition, the entire gas adsorbing material in the housing container is located within a predetermined distance from the heat transfer member, the predetermined distance being shorter than the maximum distance between the central axis of the housing container and the inner surface of the housing container. Thus, the temperature irregularity of the gas adsorbing material can be reduced, and the gas adsorbing material in the housing container can be subjected to the heat treatment substantially uniformly.

According to the configuration of the gas adsorbing device of the present invention, even in the case of performing the heat treatment in a reduced pressure and high temperature atmosphere, by the existence of the heat transfer member, the temperature irregularity of the gas adsorbing material can be reduced, and the heat treatment of the gas adsorbing material in the housing container can be performed substantially uniformly. With this, the heat treatment for giving the gas adsorbing ability to the gas adsorbing material can be performed stably in terms of quality.

A seventh aspect of the present invention is configured such that especially in the fifth aspect of the present invention, the gas adsorbing material is a material whose air adsorbing performance improves by a heat treatment, the heat transfer member is provided so as to contact the gas adsorbing material in the housing container, and at least a part of the heat transfer member is exposed from the gas adsorbing material in the housing container.

According to the above configuration, in the heat treatment, the gas adsorbing material can receive the heat from a portion thereof that is in close contact with the inner surface of the housing container. In addition, a portion, exposed from the gas adsorbing material, of the heat transfer member in the housing container receives radiation heat from the housing container. Further, since the heat transfer member is higher in the heat-transfer performance than the gas adsorbing material, the heat transfer member having received the heat transfers the heat to the entire heat transfer member. Thus, the temperature of the entire surface of the heat transfer member becomes substantially uniform. Further, since the heat transfer member contacts the gas adsorbing material at a portion thereof embedded in the gas adsorbing material, the heat transfer member transfers the heat to the gas adsorbing material.

As above, radiation heat received from the housing container by the part, exposed from the gas adsorbing material in the housing container, of the heat transfer member that is higher in the heat-transfer performance than the gas adsorbing material is transferred to the gas adsorbing material through a portion, contacting the gas adsorbing material, of the heat transfer member. Therefore, the heat can be transferred to the gas adsorbing material in a short period of time, and the temperature irregularity of the gas adsorbing material in the vicinity of a portion, contacting the gas adsorbing material, of the heat transfer member can be reduced.

Therefore, according to the configuration of the gas adsorbing device of the present invention, the heat treatment performed under reduced pressure for giving the gas adsorbing ability to the gas adsorbing material can be performed stably in terms of quality in a short period of time.

An eighth aspect of the present invention is configured such that especially in the sixth or seventh aspect of the present invention, the material of the heat transfer member is metal.

According to the above configuration, since the material of the heat transfer member is metal, an effect in which the heat is easily transferred by the excellent thermal conductivity of the metal is obtained in addition to the effect of the seventh aspect of the present invention.

A ninth aspect of the present invention is configured such that especially in the eighth aspect of the present invention, the material of the heat transfer member is metal that is lower in emissivity than the housing container.

According to the above configuration, since the material of the heat transfer member is metal whose emissivity is lower than that of the housing container, the heat transfer member becomes higher in temperature than the housing container. Therefore, an effect in which the heat is more easily transferred to the gas adsorbing material is obtained in addition to the effect of the eighth aspect of the present invention.

A tenth aspect of the present invention is a vacuum insulation panel including at least: a core material; and the gas adsorbing device according to any one of the first to ninth aspect of the present invention, wherein: the core material and the gas adsorbing device are covered with a coating member having a gas barrier property; and an inside of the coating member is reduced in pressure.

According to the above configuration, the high heat insulation property of the vacuum insulation panel can be maintained for a long period of time.

Hereinafter, embodiments of the present invention will be explained in reference to the drawings. The same reference signs are used for the same components as in embodiments explained earlier, and a detailed explanation thereof is omitted. The present invention is not limited to these embodiments.

Embodiment 1

Figure 2:
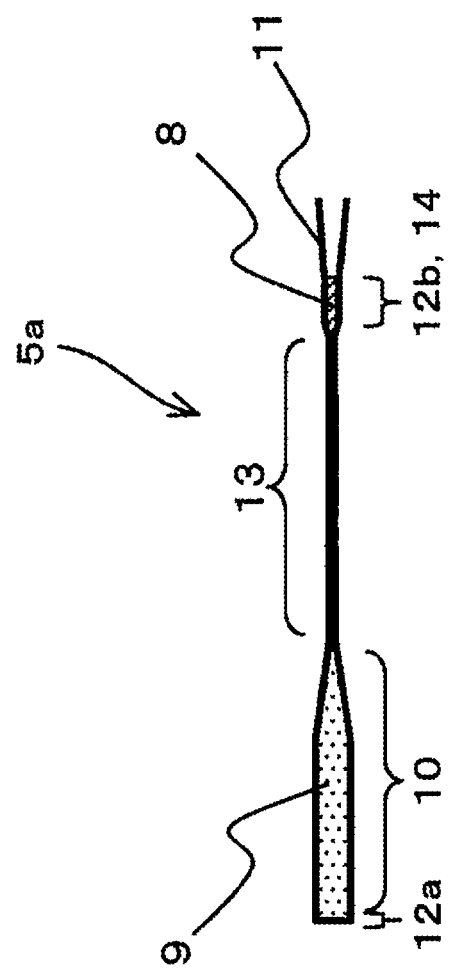
FIG. 2 is a cross-sectional view taken along line A-A of FIG. 1.

FIG. 1 is a plan view showing a configuration example of a gas adsorbing device according to Embodiment 1 of the present invention. FIG. 2 is a cross-sectional view taken along line A-A of FIG. 1.

As shown in FIGS. 1 and 2, a gas adsorbing device 5a according to Embodiment 1 includes: a gas adsorbing material 9 that is made of copper ion-exchanged ZSM-5 zeolite and adsorbs nitrogen; and a housing container 11 that has a long, thin, flat, tubular shape, houses the gas adsorbing material 9 under reduced pressure, and is made of aluminum.

The housing container 11 includes: a housing portion 10 configured to house the gas adsorbing material 9; and seal portions 12 respectively located at both ends of the housing portion 10. A seal portion 12a that is one of the seal portions 12 respectively located at both ends of the housing portion 10 is a bottom obtained such that the housing container 11 is formed by deep drawing to have a bottomed tubular shape. A seal portion 12b that is the other seal portion is formed such that a narrow portion 14 where opposing inner surfaces of the housing container 11 are located close to each other is sealed with sealing glass. At each of the seal portions 12a and 12b respectively located at both ends of the housing portion 10, the narrow portion 14 may be formed to be sealed with the sealing glass. Further, the housing container 11 includes a contact portion 13 located between the seal portion 12b and the housing portion 10 and formed such that the opposing inner surfaces of the housing container 11 are in close contact with each other.

As shown in FIG. 2, the gas adsorbing device 5a includes depressed portions that are respectively located on two opposing flat surfaces of the housing container 11 and are depressed from the housing portion 10. Specifically, the depressed portions are formed by the contact portion 13 that forms the bottom, and the seal portion 12b and the housing portion 10 that form edges that are obliquely raised along the thickness direction of the housing container 11 from the two flat surfaces (bottoms) of the contact portion 13. Instead of the depressed portions respectively formed on the two opposing flat surfaces of the housing container 11, the depressed portion may be formed on one of two opposing flat surfaces of the housing container 11.

When causing the internal space of the housing container 11 to communicate with the outside of the housing container 11 (when opening the gas adsorbing device 5a), the contact portion 13 expands, so that a space between the inner surfaces of the housing container 11 at the contact portion 13 is formed in the gas adsorbing device 5a. In other words, when opening the gas adsorbing device 5a, air that serves as a medium of vibrations flows into the housing container 11, and in the housing portion 10, the state of the gas adsorbing material 9 shifts from a state where the gas adsorbing material 9 is in close contact with the inner surface of the housing container 11 to a state where the gas adsorbing material 9 is separated from the inner surface of the housing container 11.

The gas adsorbing device 5a as above is produced by the following producing method.

To be specific, the producing method of the gas adsorbing device 5a includes the steps of: housing the gas adsorbing material 9 in the housing container 11; forming the narrow portion 14 while forming the contact portion 13 by an external force; placing the sealing glass on the inner surface (the narrow portion 14) of the housing container 11, which becomes the seal portion 12b; and putting the housing container 11 in the vacuum heating furnace to perform the heat treatment. Especially, the step of performing the heat treatment specifically includes the steps of: activating the gas adsorbing material 9; melting the sealing glass under reduced pressure; solidifying the sealing glass while slowly cooling the heating furnace; and annealing the housing container.

It is preferable that the producing method include the step of adjusting the flatness of the housing container 11 and the thickness of the housing container 11 at the time of the deep drawing such that the contact portion 13 is formed between the housing portion 10 and the seal portion 12b, located on the narrow portion 14 side, by the pressure difference between the inside and outside of the housing container 11.

It is also preferable that the producing method include the step of adjusting the capacity of the housing container 11 between the seal portion 12a and the narrow portion 14 before the sealing of the narrow portion 14 such that this capacity of the housing container 11 becomes adequately larger than the amount (volume) of gas adsorbing material 9 to be put into the housing container 11.

From the viewpoint of the improvement of the gas adsorbing effect, it is preferable that the amount of gas adsorbing material 9 be larger. In the heat treatment of the vacuum heating furnace, a gas is emitted from the gas adsorbing material 9 in the housing container 11. Therefore, if the amount of gas adsorbing material 9 is too large, the internal pressure increases by the emitted gas, and it becomes difficult to seal the housing container 11. In addition, there is a possibility that the sealing material placed at the narrow portion 14 is displaced by the force of the emitted gas, and the narrow portion 14 cannot be appropriately sealed with the sealing material. Therefore, the amount of gas adsorbing material 9 in the capacity of the portion located on an inner side of the narrow portion 14 (in other words, a ratio between the size of the housing portion 10 and the size of the contact portion 13) needs to be set appropriately. In the present embodiment, the ratio of the length of the contact portion 13 to the length of the housing portion 10 is set to about 1:1.

Further, it is preferable that the producing method include the step of placing the housing container 11 lengthwise such that the longitudinal direction of the housing container 11 corresponds to the vertical direction, and the seal portion 12b is located above the seal portion 12a along the vertical direction for a period until the housing container 11 is put in the vacuum heating furnace, the sealing glass is solidified, and external pressure of the housing container 11 is set back to atmospheric pressure.

By applying the excitation to the gas adsorbing device 5a which is produced by the above producing method and whose airtightness is being secured (which is being completely sealed), a natural frequency of about 480 Hz is obtained. In the case of the gas adsorbing device whose airtightness is not being secured (which is being incompletely sealed) since a small hole is formed in the seal portion 12 made of the sealing glass, the natural frequency is about 1,300 Hz. It is considered that when producing the gas adsorbing device in a state where it is difficult to secure the airtightness of the housing container 11 and the airtightness of the portion filled with the sealing glass, the air that serves as the medium of the vibrations flows into the housing container 11, and the gas adsorbing material 9 that is in close contact with the inner surface of the housing container 11 is separated from the inner surface of the housing container 11 in the housing portion 10, so that the gas adsorbing material 9 easily vibrates, and this changes (increases) the natural frequency of the gas adsorbing device.

Figure 3:
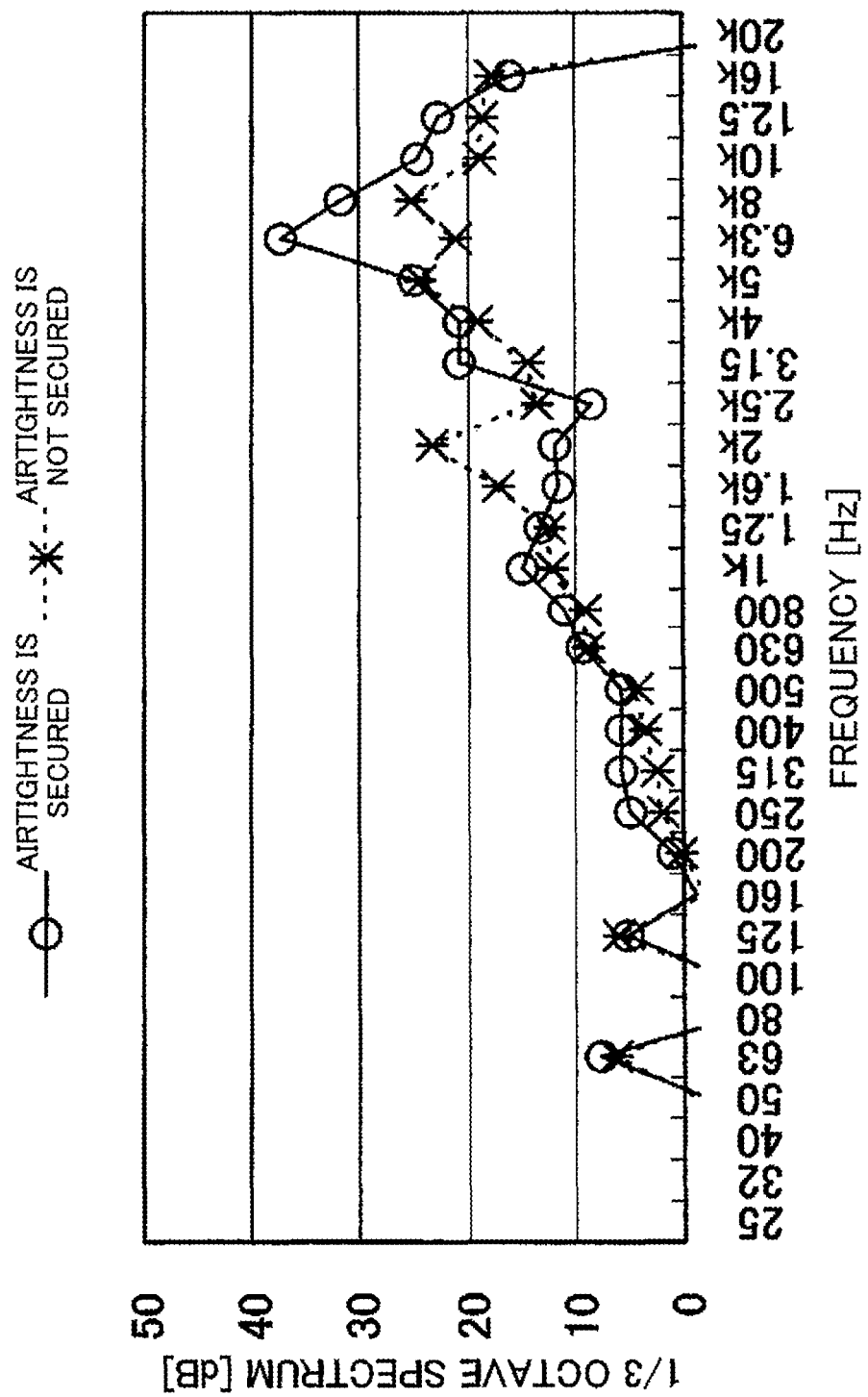
FIG. 3 is a characteristic diagram showing a characteristic example of sounds generated when excitation is applied to the gas adsorbing device of Embodiment 1 of the present invention.

FIG. 3 shows a ⅓ octave spectrum band analysis result obtained by analyzing sounds generated when the excitation is applied to the gas adsorbing device 5a. As shown in FIG. 3, in the case of the gas adsorbing device 5a whose airtightness is being secured, a peak is confirmed around 6,000 Hz, but in the case of the gas adsorbing device whose airtightness is not being secured, a clear peak does not exist around 6,000 Hz.

As above, the gas adsorbing device 5a includes the gas adsorbing material 9 and the housing container 11 having a long, thin, flat, tubular shape, configured to house the gas adsorbing material 9 under reduced pressure, and made of metal. The housing container 11 includes the housing portion 10 configured to house the gas adsorbing material 9 and the seal portions 12 respectively located at both ends of the housing portion 10. The housing container 11 further includes the contact portion 13 located between one of the seal portions (12a and 12b) and the housing portion 10 and formed such that the opposing inner surfaces of the housing container 11 are in close contact with each other.

According to the above configuration, since both ends of the housing container 11 are sealed, the airtightness of the housing container 11 is being secured. In a case where the airtightness of the housing container 11 is not being secured (the sealing of the housing container 11 is incomplete), the pressure difference between the inside and outside of the housing container 11 is little. Therefore, the contact force between the gas adsorbing material 9 and the housing container 11 by the pressure difference between the inside and outside of the housing container 11 is lost. In other words, in a case where the airtightness of the housing container 11 is being secured, the gas adsorbing material 9 is housed in the housing container 11 so as to be in close contact with the inner surface of the housing container 11 by the pressure difference between the inside and outside of the housing container 11.

As above, since the airtightness of the housing container 11 is secured, the gas adsorption performance is maintained, and in addition, the air as a medium that causes the vibrations of the gas adsorbing material 9 is prevented from flowing into the housing container 11, and the gas adsorbing material 9 is housed in the housing portion 10 so as to be in close contact with the inner surface of the housing container 11 such that the vibrations of the gas adsorbing material 9 in the housing portion 10 are suppressed. Therefore, in a case where the excitation is applied to the gas adsorbing device 5a, as compared to the gas adsorbing device in which the airtightness of the housing container 11 is not being secured (the sealing of the housing container 11 is incomplete), the vibrations of the gas adsorbing material 9 in the housing portion 10 are suppressed, the natural frequency of the gas adsorbing device 5a changes (decreases), and the sounds corresponding to the change in the natural frequency are generated. To be specific, by the difference of the sounds generated when the excitation is applied to the gas adsorbing device, whether or not the airtightness of the housing container 11 is being secured, that is, the sealed state under reduced pressure (whether or not the gas adsorption performance is being maintained) can be easily confirmed.

In the gas adsorbing device 5a, the depressed portion depressed from the housing portion 10 is formed on at least one of two opposing flat surfaces of the housing container 11. In the gas adsorbing device 5a, the contact portion 13 is the above-described depressed portion. According to this configuration, the sounds easily echo, so that the difference of the sounds generated when the excitation is applied to the gas adsorbing device becomes clearer. Therefore, the sealed state under reduced pressure can be confirmed more easily.

In the gas adsorbing device 5a, in a case where the airtightness of the housing container 11 is being secured, the contact force between the inner surfaces of the housing container 11 at the contact portion 13 is maintained. However, in a case where the airtightness of the housing container 11 is not being secured, the contact force between the inner surfaces of the housing container 11 at the contact portion 13 by the pressure difference between the inside and outside of the housing container 11 is lost. Therefore, the tendency of the vibrations of the gas adsorbing material 9 changes depending on the change in the state of the contact portion 13 corresponding to whether or not the airtightness of the housing container 11 is being secured. That is, according to the above configuration, as compared to a case where the contact portion 13 is not formed, the difference of the sounds generated when the excitation is applied to the gas adsorbing device becomes clearer. Thus, the sealed state under reduced pressure can be confirmed more easily.

As above, by confirming the difference of the sounds generated when the excitation is applied to the gas adsorbing device, it is possible to perform screening of the gas adsorbing device in which the sealing with the sealing material is incomplete, and the gas adsorption performance is unstable. Thus, only the gas adsorbing device having the stable gas adsorption performance can be housed in the device, such as the vacuum insulation panel, which is required to maintain the vacuum.

In the gas adsorbing device 5a, in a case where the internal space of the housing container 11 is caused to communicate with the outside of the housing container 11, the contact portion 13 expands, so that a space is formed between the inner surfaces of the housing container 11 at the contact portion 13. With this configuration, the difference of the sounds generated when the excitation is applied to the gas adsorbing device becomes clearer between a case where the sealing with the sealing material is complete and a case where it is incomplete.

The gas adsorbing material 9 may be any material as long as it has an ability to adsorb nitrogen and oxygen in the air. The gas adsorbing material 9 is not limited to ZSM-5 zeolite. For example, a lithium compound may be used as the gas adsorbing material 9. The housing container 11 may be any container as long as it serves to house the gas adsorbing material 9 under reduced pressure and form the contact portion 13. The housing container 11 is not limited to an aluminum housing container. For example, the housing container 11 may be made of a metal material, such as copper, iron, or stainless steel, in addition to aluminum. Further, it is desirable that the housing container 11 be being subjected to annealing to facilitate the formation of the contact portion 13. It is more desirable that from the standpoint of formability and cost, the housing container be made of aluminum having a thickness of less than 0.5 mm. The seal portions 12a and 12b may be any units as long as they maintain the inside of the housing container 11 at the reduced pressure state. Each of the seal portions 12a and 12b is not limited to the seal portion formed by sealing the narrow portion 14 with the sealing glass. For example, it is possible to utilize a method of filling an adhesive member, such as brazing filler metal or adhesive, instead of the sealing glass, in the inner surfaces of the housing container, a method of causing the opposing inner surfaces of the housing container 11 to be joined to each other using high frequency welding, ultrasonic welding, or the like, or a method of forming a bottom such that the inner surfaces of the housing container 11 becomes continuous with each other (are in close contact with each other) by impact press or deep drawing. The above various modification examples are also adopted in the following embodiments.

Embodiment 2

Figure 4:
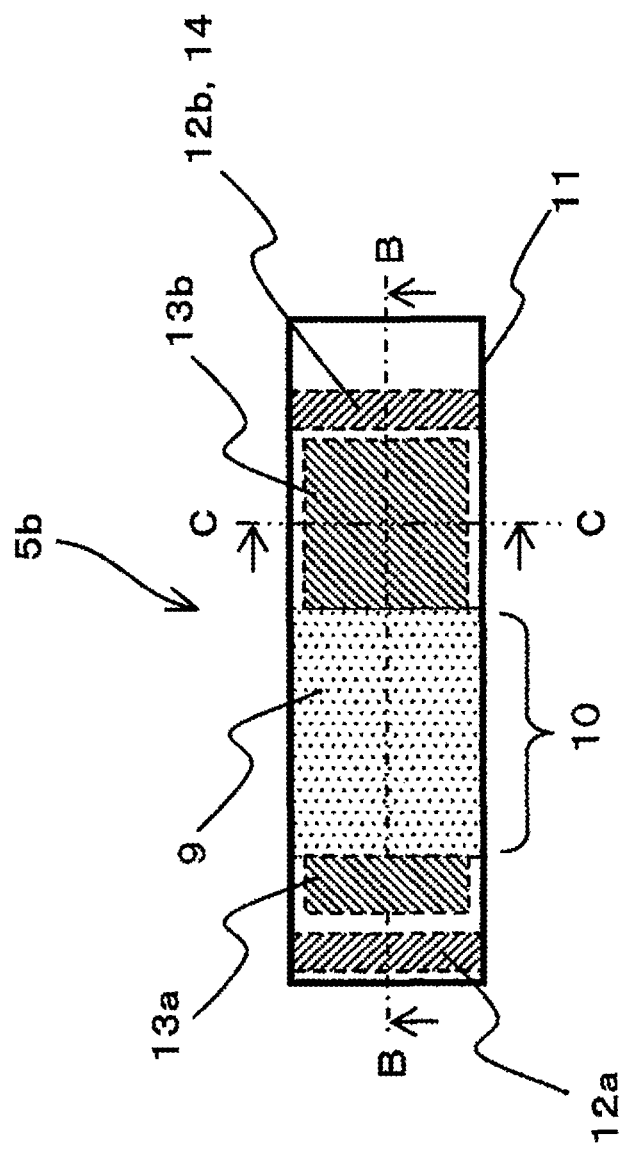
FIG. 4 is a plan view showing a configuration example of the gas adsorbing device of Embodiment 2 of the present invention.
Figure 5:
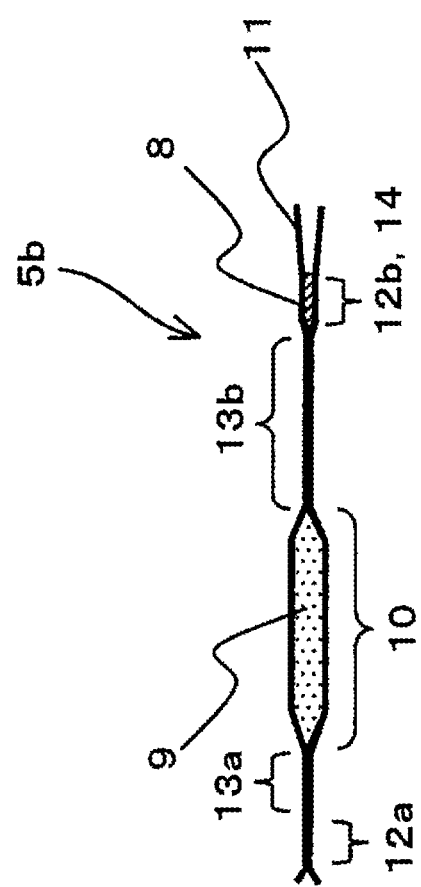
FIG. 5 is a cross-sectional view taken along line B-B of FIG. 4.
Figure 6:
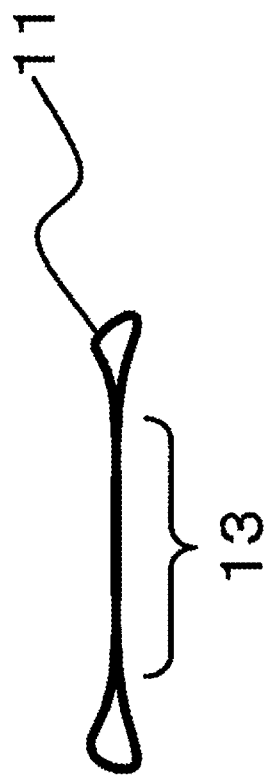
FIG. 6 is a cross-sectional view taken along line C-C of FIG. 4.

FIG. 4 is a plan view showing a configuration example of the gas adsorbing device of Embodiment 2 of the present invention. FIG. 5 is a cross-sectional view taken along line B-B of FIG. 4. FIG. 6 is a cross-sectional view taken along line C-C of FIG. 4.

As shown in FIGS. 4 to 6, a gas adsorbing device 5b according to the present embodiment includes: the gas adsorbing material 9 that is made of copper ion-exchanged ZSM-5 zeolite and adsorbs nitrogen; and the housing container 11 that has a long, thin, flat, tubular shape and is made of aluminum and in which both sides of the housing portion 10 configured to house the gas adsorbing material 9 under reduced pressure are sealed.

The seal portion 12a that is one of the seal portions 12 respectively located at both ends of the housing portion 10 is sealed such that the opposing inner surfaces of the housing container 11 are caused to get close to each other to be subjected to the ultrasonic welding. The seal portion 12b is sealed such that the narrow portion 14 where the opposing inner surfaces of the housing container 11 are located close to each other is sealed with the sealing glass as with Embodiment 1.

The gas adsorbing device 5b includes a contact portion 13a located between the seal portion 12a and the housing portion 10 and formed such that the opposing inner surfaces of the housing container 11 contact each other and also includes a contact portion 13b located between the seal portion 12b and the housing portion 10 and formed such that the opposing inner surfaces of the housing container 11 contact each other. As shown in FIG. 5, the gas adsorbing device 5b includes depressed portions that are respectively located on two opposing flat surfaces of the housing container 11 and depressed from the housing portion. Specifically, the depressed portions are formed by the contact portion 13a that forms the bottom, and the seal portion 12a and the housing portion 10 that form edges that are obliquely raised along the thickness direction of the housing container 11 from the two flat surfaces (bottoms) of the contact portion 13a. Similarly, the depressed portions are formed by the contact portion 13b that forms the bottom, and the seal portion 12b and the housing portion 10 that form edges that are obliquely raised along the thickness direction of the housing container 11 from the two flat surfaces (bottoms) of the contact portion 13b. Instead of the depressed portions respectively formed on the two opposing flat surfaces of the housing container 11, the depressed portion may be formed on one of two opposing flat surfaces of the housing container 11.

As shown in FIG. 6, a thin portion that is the thinnest in a cutting surface perpendicular to the longitudinal direction of the housing container 11 is a cutting surface of each of the contact portions 13a and 13b. Further, a center portion of each of the contact portions 13a and 13b along a short-length direction (width direction) of the housing container 11 is depressed such that edges are respectively formed at both ends of each of the contact portions 13a and 13b along the short-length direction (width direction) of the housing container 11. Specifically, each of the contact portions 13a and 13b forms a bottom within a predetermined distance along the short-length direction (width direction) of the housing container 11 from a center line of each of the contact portions 13a and 13b along the longitudinal direction of the housing container 11. On each of two flat surfaces forming the bottom of each of the contact portions 13a and 13b, edges that are obliquely raised along the thickness direction of the housing container 11 are respectively formed at both ends of each of the contact portions 13a and 13b along the short-length direction (width direction) of each of the contact portions 13a and 13b.

Further, when causing the internal space of the housing container 11 to communicate with the outside of the housing container 11 (when opening the gas adsorbing device 5b), the contact portions 13a and 13b expand, so that a space between the inner surfaces of the housing container 11 at each of the contact portions 13a and 13b is formed in the gas adsorbing device 5b.

The gas adsorbing device 5b is produced by the following producing method. First, one end of the housing container 11 is sealed by the ultrasonic welding. Next, in order to form the contact portion 13a between the seal portion 12a that has been sealed by the ultrasonic welding and the housing portion 10 configured to house the gas adsorbing material 9, opposing inner surfaces of a portion that is located between the seal portion 12a and the housing portion 10 and becomes the contact portion 13a are caused to be in close contact with each other by the external force. Next, the gas adsorbing material 9 is housed in the housing container 11. Next, the narrow portion 14 is formed to form the seal portion 12b. Next, the sealing glass is placed on the inner surface, which becomes the seal portion 12b, of the housing container 11, and the housing container 11 is put in the vacuum heating furnace to be subjected to the heat treatment. As with Embodiment 1, the step of performing the heat treatment of the gas adsorbing device 5b includes the steps of: activating the gas adsorbing material 9; melting the sealing glass under reduced pressure; solidifying the sealing glass while slowly cooling the heating furnace; and annealing the housing container.

It is preferable that the producing method include the step of adjusting the flatness of the housing container 11 and the thickness of the housing container 11 such that the contact portion 13b is formed between the housing portion 10 and the seal portion 12b located on the narrow portion 14 side by the pressure difference between the inside and outside of the housing container 11.

It is also preferable that in addition to the above adjusting step, the producing method include the step of adjusting the capacity of the housing container 11 between the contact portion 13a located on the side of the seal portion 12a sealed by the ultrasonic welding and the narrow portion 14 (in other words, adjusting the total of the capacity of the housing portion 10 and the capacity of the contact portion 13b) such that this capacity of the housing container 11 becomes adequately larger than the amount (volume) of gas adsorbing material 9 to be put into the housing container 11.

It is preferable that the producing method include the step of placing the housing container 11 lengthwise such that the longitudinal direction of the housing container 11 corresponds to the vertical direction, and the seal portion 12b on the narrow portion 14 side is located above the seal portion 12a sealed by the ultrasonic welding for a period until the housing container 11 is put in the vacuum heating furnace, the sealing glass is solidified, and the external pressure of the housing container 11 is set back to the atmospheric pressure.

By applying the excitation to the gas adsorbing device 5b which is produced by the producing method and whose airtightness is being secured (which is being completely sealed), the natural frequency of about 500 Hz is obtained. In the case of the gas adsorbing device whose airtightness is not being secured (which is being incompletely sealed) since a small hole is formed in one of the seal portions 12a and 12b made of the sealing glass, the natural frequency is about 1,700 Hz. To be specific, as with Embodiment 1, by confirming the difference of the sounds generated when the excitation is applied to the gas adsorbing device, it is possible to perform the screening of the gas adsorbing device in which the sealing with the sealing material is incomplete, and the gas adsorption performance is unstable. Thus, only the gas adsorbing device having the stable gas adsorption performance can be housed in the device, such as the vacuum insulation panel, which is required to maintain the vacuum.

Figure 7:
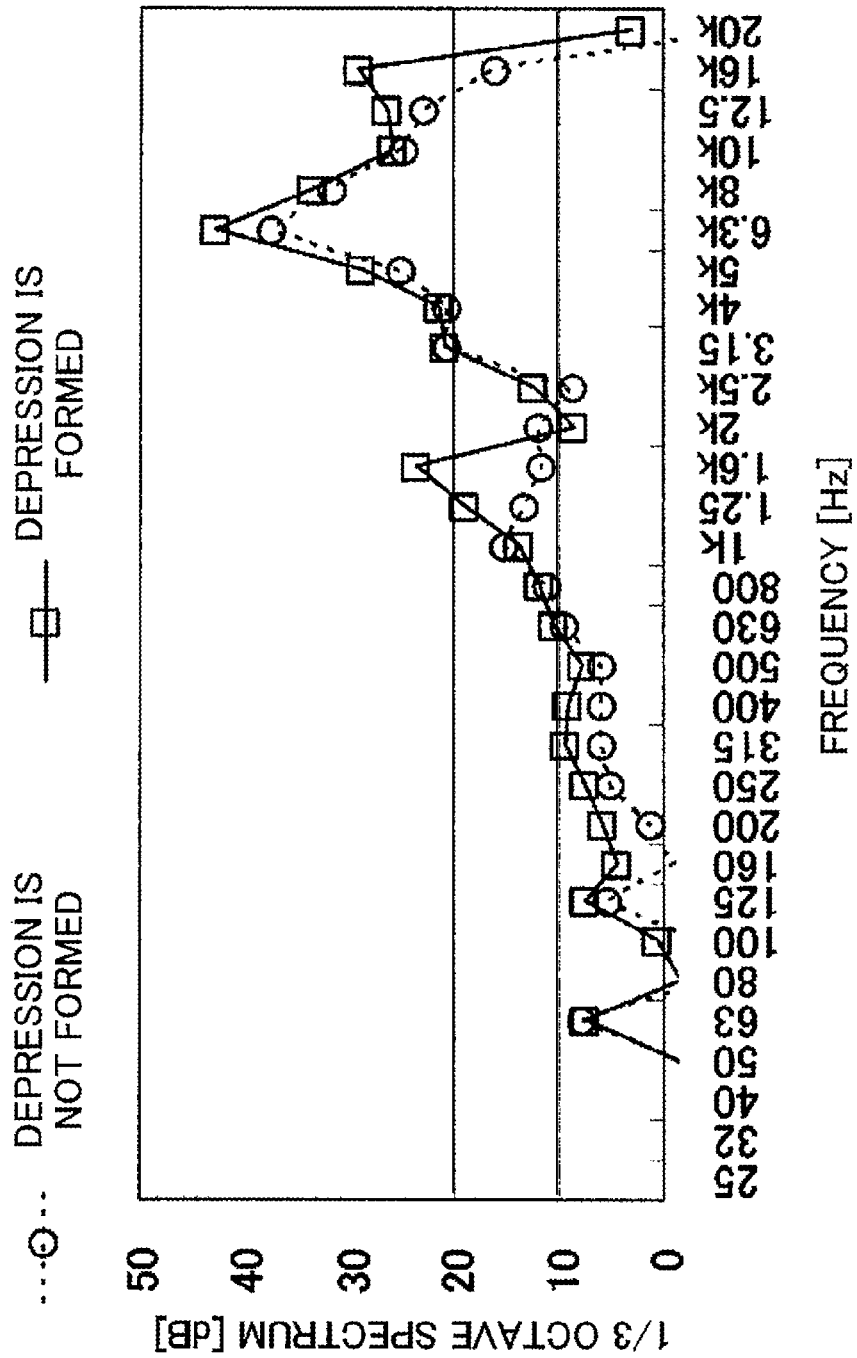
FIG. 7 is a characteristic diagram showing a characteristic example of the sounds generated when the excitation is applied to the gas adsorbing device of Embodiment 2 of the present invention.

FIG. 7 shows a ⅓ octave band analysis result obtained by comparing the analytical result of the sounds generated when the excitation is applied to the gas adsorbing device 5b produced by the above producing method with the gas adsorbing device 5a of Embodiment 1. As shown in FIG. 7, when comparing the gas adsorbing device 5b (Embodiment 2) in which the edges are respectively formed at both ends of each of the contact portions 13a and 13b along the short-length direction (width direction) of the housing container 11 (the center portions of the contact portions 13a and 13b are depressed) to the gas adsorbing device 5a (Embodiment 1) in which the edges are not respectively formed at both ends of the contact portion 13 along the short-length direction of the housing container 11 (the outer surface of the contact portion 13 is substantially flat), the clearer peak can be confirmed in the vicinity of 6,000 Hz in the case of the gas adsorbing device 5b. To be specific, the sounds echo more than Embodiment 1, so that the difference of the sounds generated when the excitation is applied to the gas adsorbing device can be confirmed more clearly.

Embodiment 3

Figure 8:
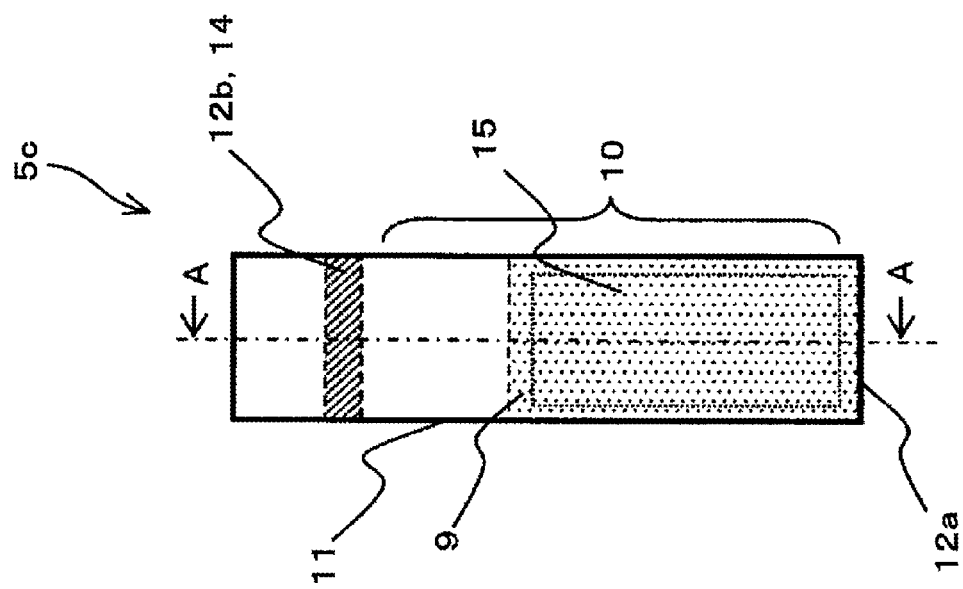
FIG. 8 is a plan view showing a configuration example of the gas adsorbing device of Embodiment 3 of the present invention.
Figure 9:
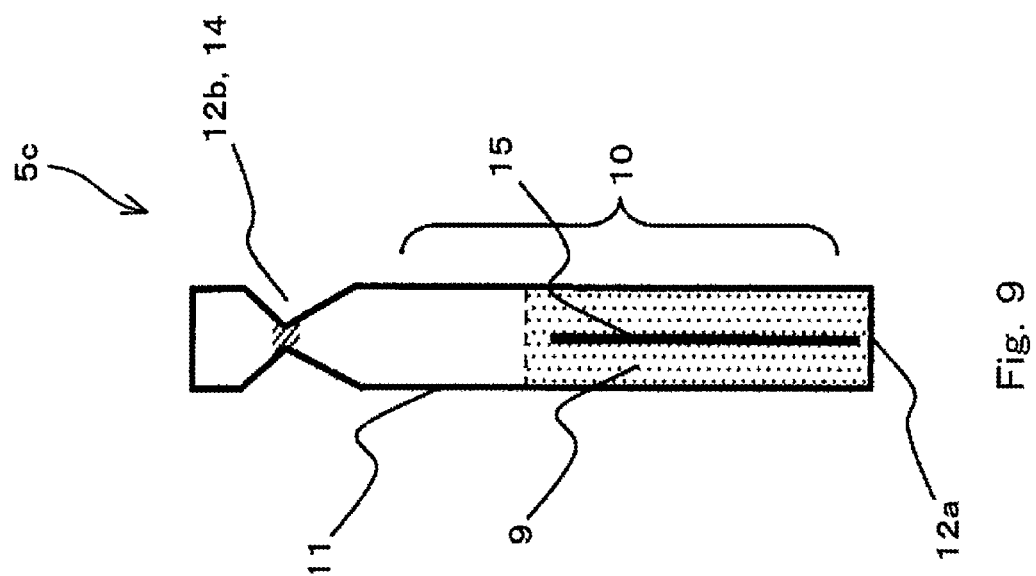
FIG. 9 is a cross-sectional view taken along line A-A of FIG. 8.

FIG. 8 is a plan view showing a schematic configuration example of the gas adsorbing device according to Embodiment 3 of the present invention. FIG. 9 is a cross-sectional view taken along line A-A of FIG. 8.

As shown in FIGS. 8 and 9, a gas adsorbing device 5c according to Embodiment 3 includes: the gas adsorbing material 9 which is made of copper ion-exchanged ZSM-5 zeolite and adsorbs nitrogen and whose air adsorbing performance improves by the heat treatment; the housing container 11 that has a long, thin, substantially flat, tubular shape and is made of aluminum and in which both sides of the housing portion 10 configured to house the gas adsorbing material 9 under reduced pressure are sealed; and one plate-shaped heat transfer member 15 made of a metal material that is higher in the heat-transfer performance than the gas adsorbing material 9 and embedded in the gas adsorbing material 9 in the housing container 11. Although not shown in FIGS. 8 and 9, as with Embodiment 1 or 2, it is preferable to form the contact portion 13 at the housing container 11. In the case of the example shown in FIGS. 8 and 9, the contact portion 13 is formed between the housing portion 10 and the seal portion 12b.

To transfer heat to the entire gas adsorbing material 9 as uniformly as possible, one plate-shaped heat transfer member 15 is provided so as not to contact the opposing inner surfaces of the housing container 11, that is, provided such that the gas adsorbing material 9 is interposed between each of both surfaces of the heat transfer member 15 and the inner surface of the housing container 11. In the present embodiment, to efficiently reduce the temperature irregularity of the gas adsorbing material 9 in the housing container 11 by the heat transfer from the heat transfer member 15, the sizes of the plate-shaped surfaces of the heat transfer member 15 are set such that: the entire gas adsorbing material 9 in the housing container 11 is located within a predetermined distance from the heat transfer member 15, the predetermined distance being shorter than a maximum distance between a central axis of the housing container 11 and the inner surface of the housing container 11; and the heat transfer member 15 contacts the gas adsorbing material 9 in the housing container 11. In addition, the heat transfer member 15 is embedded in the gas adsorbing material 9 in the housing container 11 such that the plate-shaped surfaces thereof are located at a middle position between two opposing substantially flat surfaces of the housing container 11 and are respectively opposed to the two opposing substantially flat surfaces of the housing container 11.

According to the configuration shown in FIGS. 8 and 9, one plate-shaped heat transfer member 15 is used. However, the present embodiment is not limited to this. As long as there is little adverse affect on the heat transfer, the heat transfer member 15 may have a hole or have any shape, such as a cross shape, a radially joined shape, or a spiral shape.

A material of the heat transfer member 15 is not limited. In a case where the material of the heat transfer member 15 is metal, the heating of the gas adsorbing material 9 in the housing container 11 is further accelerated by the excellent heat-transfer performance of the metal. Thus, the heat treatment of the gas adsorbing material 9 can be successfully performed.

Further, in a case where the material of the heat transfer member 15 is a metal material that is lower in emissivity than the metal material of the housing container 11, for example, in a case where the housing container 11 is made of copper, and the heat transfer member 15 is made of aluminum, a radiative equilibrium temperature of the heat transfer member 15 becomes higher than that of the housing container 11 at the time of the heat treatment under reduced pressure. Therefore, the heat transfer from a portion of the gas adsorbing material 9 where the heat transfer member 15 is embedded, that is, from the inside of the gas adsorbing material 9 is accelerated. Thus, the heat treatment of the gas adsorbing material 9 can be uniformly, successfully performed within a shorter period of time.

As a method of improving the heat-transfer performance of the heat transfer member 15, there is a method of increasing the thickness of the heat transfer member 15 in addition to a method of forming the heat transfer member 15 by the metal material having the excellent heat-transfer performance. In terms of cost, the method of increasing the thickness of the heat transfer member 15 is superior to the method of selecting the metal material having the excellent heat-transfer performance. However, if the thickness of the heat transfer member 15 is increased too much, the amount of gas adsorbing material 9 housed in the gas adsorbing device 5c decreases, so that the amount of air adsorbed by the gas adsorbing device 5c decreases. To prevent the amount of gas adsorbing material 9 housed in the gas adsorbing device 5c from decreasing, the thickness and size of the gas adsorbing device 5c increase. Therefore, the thickness and material of the heat transfer member 15 need to be appropriately determined.

The seal portion 12a that is one of the seal portions 12 respectively located at both ends of the housing portion 10 is the bottom obtained such that the housing container 11 is formed by the deep drawing to have a bottomed tubular shape. The seal portion 12b that is the other seal portion is formed such that the narrow portion 14 where the opposing inner surfaces of the housing container 11 are located close to each other is sealed with the sealing glass after the heat treatment of the gas adsorbing material 9.

The gas adsorbing device 5c is produced such that: after the gas adsorbing material 9 is housed in the housing container 11, the narrow portion 14 for forming the seal portion 12b is formed; the sealing glass is placed at the inner surface of the housing container 11 which becomes the seal portion 12b; and the housing container 11 is put in the vacuum heating furnace to be subjected to the heat treatment. As with Embodiments 1 and 2, the step of performing the heat treatment includes the steps of: activating the gas adsorbing material 9; melting the sealing glass under reduced pressure; solidifying the sealing glass while slowly cooling the heating furnace; and annealing the container.

Further, in the present embodiment, the heat transfer member 15 made of the metal that is higher in the heat-transfer performance than the gas adsorbing material 9 is provided such that: the entire gas adsorbing material 9 in the housing container 11 is located within a predetermined distance from the heat transfer member 15, the predetermined distance being shorter than the maximum distance between the central axis of the housing container 11 and the inner surface of the housing container 11; and the heat transfer member 15 contacts the gas adsorbing material 9 in the housing container 11. With this, the temperature irregularity of the gas adsorbing material 9 in the housing container 11 is reduced by the heat transfer from the heat transfer member 15.

Here, since the step of activating the gas adsorbing material 9 by the heat treatment is performed in a reduced-pressure atmosphere in the vacuum heating furnace, the heat transfer to the gas adsorbing material 9 via a gas in the vacuum heating furnace is little. Therefore, the gas adsorbing material 9 is heated by the heat transfer via a contact portion between the inner surface of the housing container 11 heated in the vacuum heating furnace and the gas adsorbing material 9.

When the gas adsorbing material 9 transfers the heat, transferred from the inner surface of the housing container 11, to the heat transfer member 15 in a reduced pressure and high temperature atmosphere in the vacuum heating furnace, the heat transfer member 15 that is higher in the heat-transfer performance than the gas adsorbing material 9 transfers the heat to the entire heat transfer member 15. Thus, the temperature of the entire surface of the heat transfer member 15 becomes substantially uniform, so that the temperature of the gas adsorbing material 9 contacting the heat transfer member 15 also becomes substantially uniform. In addition, the entire gas adsorbing material 9 in the housing container 11 is located within a predetermined distance from the heat transfer member 15, the predetermined distance being shorter than the maximum distance between the central axis of the housing container 11 and the inner surface of the housing container 11. Thus, the temperature irregularity of the gas adsorbing material 9 can be reduced, and the gas adsorbing material 9 in the housing container 11 can be subjected to the heat treatment substantially uniformly.

Therefore, in the gas adsorbing device 5c, even in the case of performing the heat treatment for activating the gas adsorbing material 9 in a reduced pressure and high temperature atmosphere in the vacuum heating furnace, by the existence of the heat transfer member 15, the temperature irregularity of the gas adsorbing material 9 can be reduced, and the heat treatment of the gas adsorbing material 9 in the housing container 11 can be performed substantially uniformly. With this, the heat treatment for giving the gas adsorbing ability to the gas adsorbing material 9 can be performed stably in terms of quality.

Embodiment 4

Figure 10:
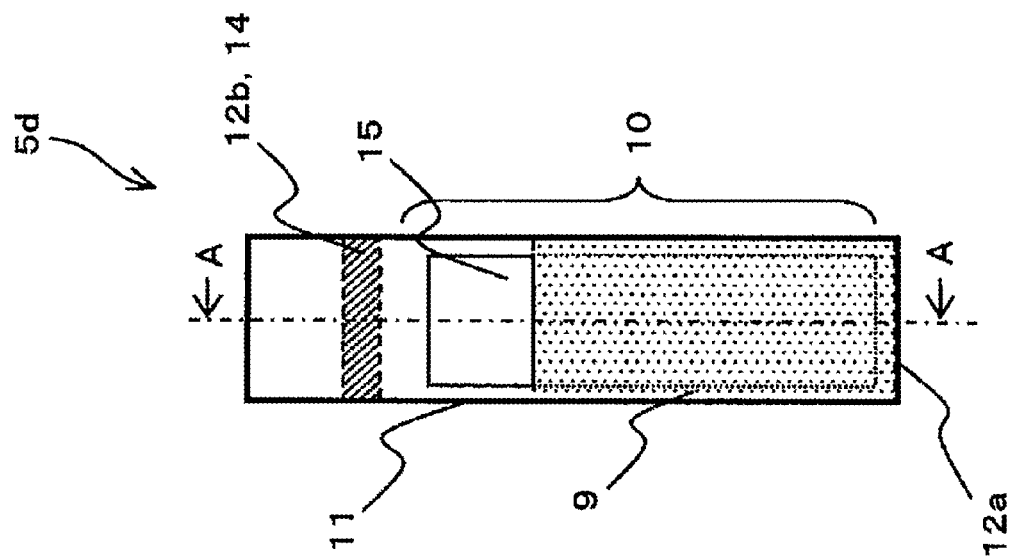
FIG. 10 is a plan view showing a configuration example of the gas adsorbing device of Embodiment 4 of the present invention.
Figure 11:
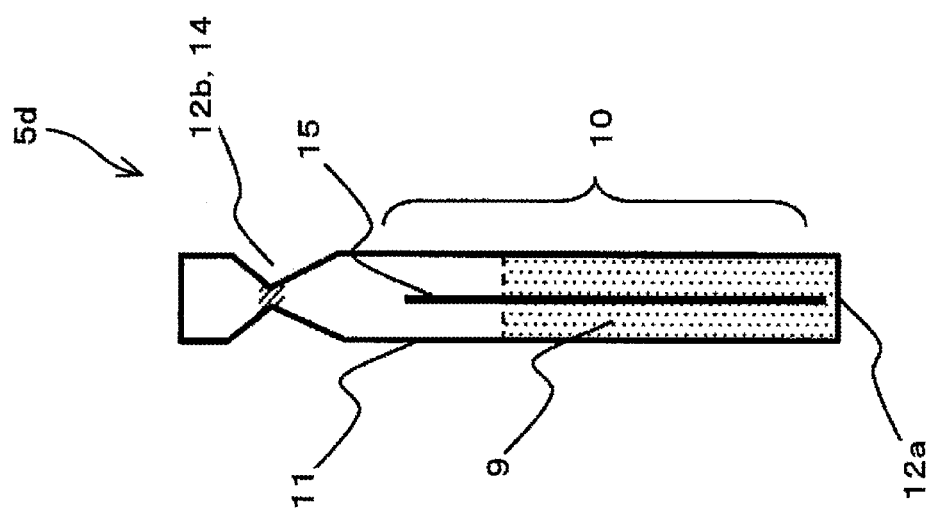
FIG. 11 is a cross-sectional view taken along line A-A of FIG. 10.

FIG. 10 is a plan view showing a schematic configuration example of the gas adsorbing device of Embodiment of the present invention. FIG. 11 is a cross-sectional view taken along line A-A of FIG. 10.

As shown in FIGS. 10 and 11, a gas adsorbing device 5d according to the present embodiment includes: the gas adsorbing material 9 which is made of copper ion-exchanged ZSM-5 zeolite and adsorbs nitrogen and whose air adsorbing performance improves by the heat treatment; the housing container 11 that has a long, thin, substantially flat, and tubular shape and is made of aluminum and in which both sides of the housing portion 10 configured to house the gas adsorbing material 9 under reduced pressure are sealed; and one plate-shaped heat transfer member 15 made of a metal material that is higher in the heat-transfer performance than the gas adsorbing material 9, a part of the heat transfer member 15 being exposed from the gas adsorbing material 9 in the housing container 11, the other part thereof being embedded in the gas adsorbing material 9 in the housing container 11. Although not shown in FIGS. 10 and 11, as with Embodiment 1 or 2, it is preferable to form the contact portion 13 at the housing container 11. In the case of the example shown in FIGS. 10 and 11, the contact portion 13 is formed between the housing portion 10 and the seal portion 12b.

To transfer heat to the entire gas adsorbing material 9 as uniformly as possible, one plate-shaped heat transfer member 15 is provided so as not to contact the opposing inner surfaces of the housing container 11, that is, provided such that the gas adsorbing material 9 is interposed between each of both surfaces of the heat transfer member 15 and the inner surface of the housing container 11. In the present embodiment, to efficiently reduce the temperature irregularity of the gas adsorbing material 9 in the housing container 11 by the heat transfer from the heat transfer member 15, the sizes of the plate-shaped surfaces of the heat transfer member 15 are set such that: the entire gas adsorbing material 9 in the housing container 11 is located within a predetermined distance from the heat transfer member 15, the predetermined distance being shorter than the maximum distance between the central axis of the housing container 11 and the inner surface of the housing container 11; the heat transfer member 15 contacts the gas adsorbing material 9 in the housing container 11; and a part of the heat transfer member 15 is exposed from the gas adsorbing material 9 in the housing container 11. In addition to this setting, the heat transfer member 15 except for the exposed part is embedded in the gas adsorbing material 9 in the housing container 11 such that the plate-shaped surfaces thereof are located at a middle position between two opposing substantially flat surfaces of the housing container 11 and are respectively opposed to the two opposing substantially flat surfaces of the housing container 11.

According to the present embodiment shown in FIGS. 10 and 11, as with Embodiment 3, one plate-shaped heat transfer member 15 is used. However, the present embodiment is not limited to this. As long as there is little adverse affect on the heat transfer, the heat transfer member 15 may have a hole or have any shape, such as a cross shape, a radially joined shape, or a spiral shape.

The seal portion 12a that is one of the seal portions 12 respectively located at both ends of the housing portion 10 is the bottom obtained such that the housing container 11 is formed by the deep drawing to have a bottomed tubular shape. The seal portion 12b that is the other seal portion is formed such that the narrow portion 14 where the opposing inner surfaces of the housing container 11 are located close to each other is sealed with the sealing glass after the heat treatment of the gas adsorbing material 9.

The gas adsorbing device 5d is produced such that: after the gas adsorbing material 9 is housed in the housing container 11, the narrow portion 14 for forming the seal portion 12b is formed; the sealing glass is placed at the inner surface of the housing container 11 which becomes the seal portion 12b; and the housing container 11 is put in the vacuum heating furnace to be subjected to the heat treatment.

As with Embodiment 3, the step of performing the heat treatment includes the steps of: activating the gas adsorbing material 9; melting the sealing glass under reduced pressure; solidifying the sealing glass while slowly cooling the heating furnace; and annealing the container.

Further, in the present embodiment, the heat transfer member 15 made of the metal that is higher in the heat-transfer performance than the gas adsorbing material 9 is provided such that at least a part thereof is exposed from the gas adsorbing material 9 in the housing container 11. Further, the heat transfer member 15 is provided such that: the entire gas adsorbing material 9 in the housing container 11 is located within a predetermined distance from the heat transfer member 15, the predetermined distance being shorter than the maximum distance between the central axis of the housing container 11 and the inner surface of the housing container 11; and the heat transfer member 15 contacts the gas adsorbing material 9 in the housing container 11. With this, while heating the housing container 11, the heating of the gas adsorbing material 9 in the housing container 11 is accelerated by the heat transfer from the heat transfer member 15. Thus, the temperature irregularity of the gas adsorbing material 9 in the housing container 11 is reduced by the heat transfer from the heat transfer member 15.

Here, since the step of activating the gas adsorbing material 9 by the heat treatment is performed in a reduced-pressure atmosphere in the vacuum heating furnace, the heat transfer to the gas adsorbing material 9 via a gas in the vacuum heating furnace is little. Therefore, the gas adsorbing material 9 is heated by the heat transfer via a contact portion between the inner surface of the housing container 11 heated in the vacuum heating furnace and the gas adsorbing material 9. The part of the heat transfer member 15 exposed from the gas adsorbing material 9 in the housing container 11 receives radiation heat from the housing container 11.

When the gas adsorbing material 9 transfers the heat, transferred from the inner surface of the housing container 11, to the heat transfer member 15 in a reduced pressure and high temperature atmosphere in the vacuum heating furnace, and the part of the heat transfer member 15 exposed from the gas adsorbing material 9 in the housing container 11 receives the radiation heat from the housing container 11, the heat transfer member 15 transfers the heat to the entire heat transfer member 15. Thus, the temperature of the entire surface of the heat transfer member 15 becomes substantially uniform, so that the temperature of the gas adsorbing material 9 contacting the heat transfer member 15 also becomes substantially uniform. In addition, the entire gas adsorbing material 9 in the housing container 11 is located within a predetermined distance from the heat transfer member 15, the predetermined distance being shorter than the maximum distance between the central axis of the housing container 11 and the inner surface of the housing container 11. Thus, the temperature irregularity of the gas adsorbing material 9 can be reduced, and the gas adsorbing material 9 in the housing container 11 can be subjected to the heat treatment substantially uniformly in a short period of time.

Therefore, in the gas adsorbing device 5d, even in the case of performing the heat treatment for activating the gas adsorbing material 9 in a reduced pressure and high temperature atmosphere in the vacuum heating furnace, by the existence of the heat transfer member 15, the temperature irregularity of the gas adsorbing material 9 can be reduced, and the heat treatment of the gas adsorbing material 9 in the housing container 11 can be performed substantially uniformly. With this, the heat treatment for giving the gas adsorbing ability to the gas adsorbing material 9 can be performed stably in terms of quality.

In addition, since the heat transfer member 15 is arranged such that parts of the plate-shaped surfaces thereof exposed from the gas adsorbing material 9 in the housing container 11 are respectively opposed to two opposing substantially flat surfaces of the substantially flat, tubular housing container 11, the heat transfer member 15 can efficiently receive the radiation heat from the housing container 11.

Further, the radiation heat emitted from the housing container 11 and received by the part of the heat transfer member 15 exposed from the gas adsorbing material 9 in the housing container 11 is transferred to the gas adsorbing material 9 via a portion of the heat transfer member 15, the portion contacting the gas adsorbing material 9. Therefore, the heat can be transferred to the gas adsorbing material 9 in a short period of time. On this account, according to the gas adsorbing device 5d, the heat treatment performed under reduced pressure for giving the gas adsorbing ability to the gas adsorbing material 9 can be performed stably in terms of quality in a short period of time.

The material of the heat transfer member 15 is not limited. In a case where the material of the heat transfer member 15 is metal, the heating of the gas adsorbing material 9 in the housing container 11 is further accelerated by the excellent heat-transfer performance of the metal. Thus, the heat treatment of the gas adsorbing material 9 can be successfully performed. As a result, it becomes possible to provide the gas adsorbing device 5 that has the stable gas adsorption performance and is inexpensive.

Further, in a case where the material of the heat transfer member 15 is a metal material that is lower in emissivity than the metal material of the housing container 11, for example, in a case where the material of the housing container 11 is copper, and the material of the heat transfer member 15 is aluminum, the radiative equilibrium temperature of the heat transfer member 15 becomes higher than that of the housing container 11 at the time of the heat treatment under reduced pressure. Therefore, the heat transfer from a portion of the gas adsorbing material 9 where the heat transfer member 15 is embedded, that is, from the inside of the gas adsorbing material 9 is accelerated. Thus, the heat treatment of the gas adsorbing material 9 can be uniformly, successfully performed within a shorter period of time. As a result, it is possible to provide the gas adsorbing device 5d that has the stable gas adsorption performance and is inexpensive.

Embodiment 5

Figure 12:
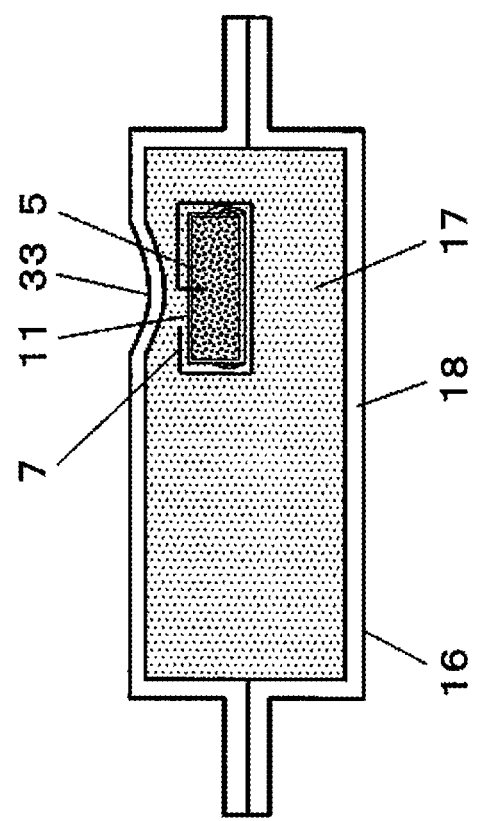
FIG. 12 is a schematic cross-sectional view showing a vacuum insulation panel of Embodiment 5 of the present invention.
Figure 13:
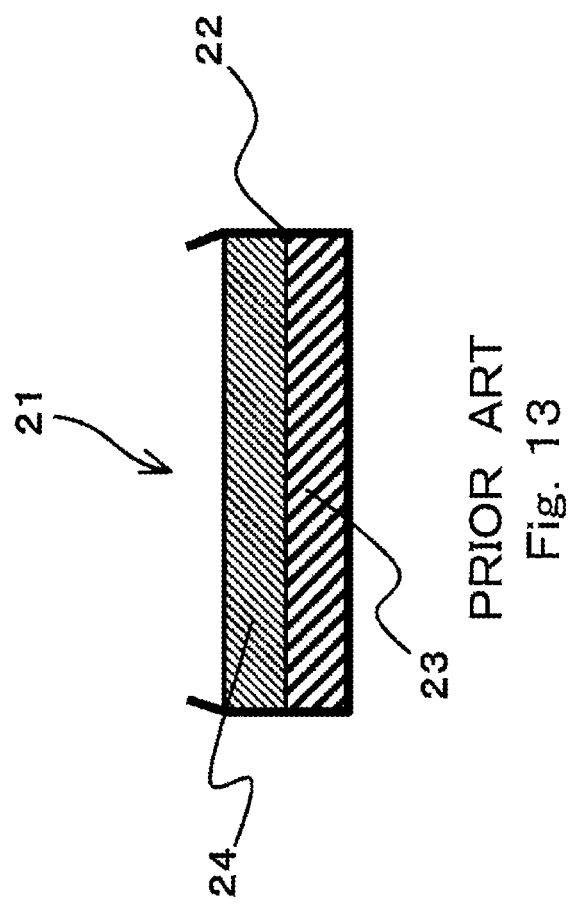
FIG. 13 is a longitudinal sectional view showing a conventional gas adsorbing device disclosed in PTL 1.
Figure 14:
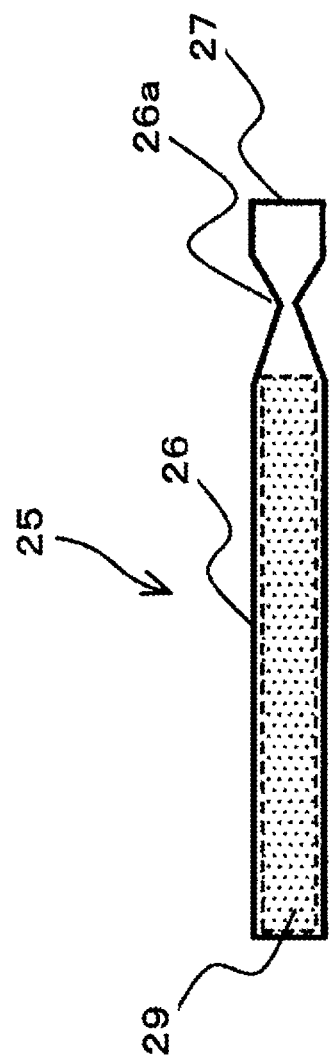
FIG. 14 is a side view of a conventional gas adsorbing device disclosed in PTL 2 when viewed from a direction perpendicular to both a longitudinal direction and thickness direction of the conventional gas adsorbing device.
Figure 15:
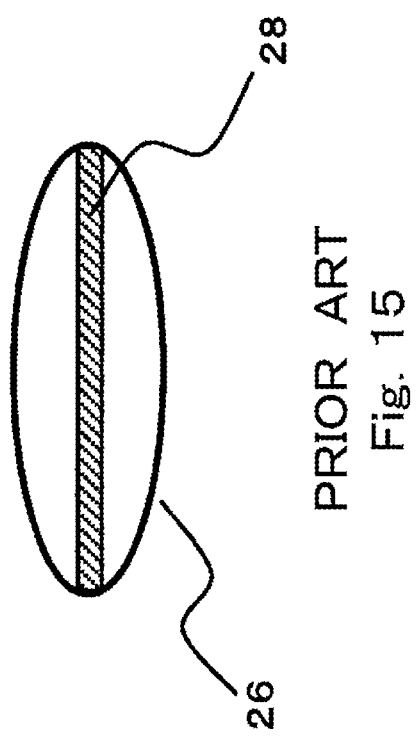
FIG. 15 is a side view of the conventional gas adsorbing device disclosed in PTL 2 when viewed from the side of an aperture sealed with a sealing material.

FIG. 12 is a cross-sectional view of the vacuum insulation panel according to Embodiment 5 of the present invention.

As shown in FIG. 12, a vacuum insulation panel 16 of the present embodiment is produced such that a core material 17 and the gas adsorbing device 5 according to any one of Embodiments 1 to 4 are covered with a coating member 18, and the coating member 18 is sealed under reduced pressure. The gas adsorbing device 5 includes the housing container 11 configured to house the gas adsorbing material and an opening member 7 attached to the housing container 11. FIG. 12 shows a state where the opening member 7 is deformed by the application of the external force after the vacuum insulation panel 16 is sealed under reduced pressure, and the housing container 11 is opened by opening a through hole on the housing container 11, so that a pressed mark 33 is formed at a portion of the coating member 18 to which the external force is applied.

Here, after the vacuum insulation panel 16 is sealed under reduced pressure, the installation positions of the housing container 11 and the opening member 7 appear as a projection and depression on the coating member 18. The external force within a range necessary to perform the opening operation is applied to the pressed mark 33 on the coating member 18 using the installation position of the opening member 7 as a landmark. To be specific, the external force is not applied to the entire housing container 11, and the pressed mark 33 is formed in a range of a part of a portion on the coating member 18, the portion being located above the installation position of the housing container 11.

Next, a constituent material of the vacuum insulation panel 16 will be explained.

The coating member 18 serves to maintain the degree of vacuum of the vacuum insulation panel 16 and is formed by laminating: a thermal welding film as an innermost layer; as an intermediate layer, a gas barrier film, that is, a resin film on which metal foil or metal atoms are deposited; and a surface protection film as an outermost layer.

The thermal welding film is not especially specified. As the thermal welding film, thermoplastic resin, such as a low-density polyethylene film, a liner low-density polyethylene film, a high-density polyethylene film, a polypropylene film, or a polyacrylonitrile film, or a mixture thereof may be used. As the gas barrier film, a metal foil (such as aluminum foil or copper foil), a polyethylene terephthalate film, a film formed by depositing metal (such as aluminum or copper) or metal oxide on an ethylene-vinyl alcohol copolymer, or the like may be used.

As the surface protection film, a known material, such as a nylon film, a polyethylene terephthalate film, or a polypropylene film, may be used.

Further, the producing method of the vacuum insulation panel is not especially specified. One example is the following producing method. A first producing method is a method of: folding one laminated film; performing thermal welding of the thermal welding film, located at opposing end portions of the laminated film, to form a pouch-shaped laminated film; inserting the core material into the laminated film; and performing the thermal welding of the thermal welding film, located at an aperture of the pouch-shaped laminated film, under reduced pressure. A second producing method is a method of: arranging two laminated films such that the thermal welding films thereof are opposed to each other; performing the thermal welding of the thermal welding films, located at the end portions of the laminated films, to form a pouch-shaped laminated film; inserting the core material into the pouch-shaped laminated film; and performing the thermal welding of the thermal welding film, located in the vicinity of the aperture of the pouch-shaped laminated film, under reduced pressure.

The core material 17 serves as a framework of the vacuum insulation panel 16 and serves to form a vacuum space. A material of the core material 17 is not especially specified. As the material of the core material 17, a known material, such as inorganic fiber (glass wool, rock wool, alumina fiber, metal fiber, or the like) or polyethylene terephthalate fiber, may be utilized. Even in the case of using the metal fiber, metal fiber made of metal having comparatively high thermal conductivity is not preferable.

Among these, it is desirable to use the glass wool that is high in elasticity as the fiber itself, low in heat conductivity as the fiber itself, and industrially inexpensive. Further, the heat conductivity of the vacuum insulation panel tends to decrease as the diameter of the fiber decreases. Therefore, it is desirable to use the fiber having a smaller diameter. However, since such fiber is not generic, the cost for the fiber is expected to increase.

Therefore, it is more desirable to use as the fiber for the vacuum insulation panel 16 the glass wool that has been commonly used, is comparatively inexpensive, and is constituted by a mass of fibers having an average fiber diameter of about 3 to 6 μm.

The gas adsorbing material serves to adsorb a mixture gas of steam, air, and the like remaining in or having entered into a sealed space of the vacuum insulation panel, and the like. The gas adsorbing material is not especially specified. As the gas adsorbing material, a chemical adsorbing material (such as calcium oxide or magnesium oxide), a physical adsorbing material (such as zeolite), or a mixture thereof may be used. In addition, the copper ion-exchanged ZSM-5 zeolite having the chemical adsorbing property and the physical adsorbing property may also be used.

The housing container 11 has a property of not easily allow a gas, such as air or steam, to flow therethrough, that is, serves to prevent the gas adsorbing material from contacting the gas.

A material of the housing container 11 is not especially specified. As the material of the housing container 11, the same laminated film or the like as the above-described coating member may be used, and it is possible to use a material capable of housing the gas adsorbing material without causing the gas adsorbing material to contact the outside air in a state where the housing container 11 is sealed under reduced pressure.

The shape of the housing container 11 is not especially limited as long as the housing container 11 can house the gas adsorbing material therein without causing the gas adsorbing material to contact the outside air in a state where it is sealed under reduced pressure.

Thus, the gas adsorbing device 5 according to the present embodiment can achieve the original function, and the vacuum insulation panel 16 can maintain the high vacuum therein for a long period of time and obtain a high heat insulation property.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the spirit of the present invention.

INDUSTRIAL APPLICABILITY

The gas adsorbing device according to the present invention is applicable to devices, such as vacuum insulation panels, vacuum heat-insulating containers, plasma displays, and fluorescent lights, which are required to maintain the vacuum. The vacuum insulation panel according to the present invention is applicable to devices, such as refrigerators, vending machines, hot water containers, heat insulating materials for buildings, heat insulating materials for vehicles, and cold/heat retention boxes, which are required to maintain the heat insulation property.

REFERENCE SIGNS LIST 5, 5a, 5b, 5c, 5d gas adsorbing device
9 gas adsorbing material
10 housing portion
11 housing container
12, 12a, 12b seal portion
13, 13a, 13b contact portion
14 narrow portion
15 heat transfer member
16 vacuum insulation panel
17 core material
18 coating member
21 gas adsorbing device
22 open-top container
23 pellet
24 pellet
25 gas adsorbing device
26 hardly-gas-permeable container
26a narrow portion
27 aperture
28 sealing material
29 gas adsorbing material

The invention claimed is:

1. A gas adsorbing device comprising:
a gas adsorbing material that adsorbs nitrogen; and
a housing container configured to have a long, thin, flat, tubular shape and house the gas adsorbing material under reduced pressure, and made of metal, wherein the housing container includes:
a housing portion configured to house the gas adsorbing material;
seal portions configured to respectively seal both sides of the housing portion; and
a contact portion located between at least one of the seal portions of the housing container and the housing portion and configured such that opposing inner surfaces of the housing container are in close contact with each other.

2. The gas adsorbing device according to claim 1, wherein at least one of two opposing flat surfaces of the housing container includes a depressed portion that is depressed from the housing portion.

3. The gas adsorbing device according to claim 1, wherein a thin portion that is thinnest in a cutting surface perpendicular to a longitudinal direction of the housing container is a cutting surface of the contact portion.

4. The gas adsorbing device according to claim 1, wherein when an internal space of the housing container is caused to communicate with an outside of the housing container, the contact portion expands, so that a space is formed between the inner surfaces of the housing container at the contact portion.

5. The gas adsorbing device according to claim 1, wherein a heat transfer member that is higher in a heat-transfer performance than the gas adsorbing material is provided such that the gas adsorbing material is interposed between each of both surfaces of the heat transfer member and the inner surface of the housing container.

6. The gas adsorbing device according to claim 5, wherein:
the gas adsorbing material is a material whose air adsorbing performance improves by a heat treatment;
the entire gas adsorbing material in the housing container is located within a predetermined distance from the heat transfer member, the predetermined distance being shorter than a maximum distance between a central axis of the housing container and the inner surface of the housing container; and
the heat transfer member is provided so as to contact the gas adsorbing material in the housing container.

7. The gas adsorbing device according to claim 5, wherein:
the gas adsorbing material is a material whose air adsorbing performance improves by a heat treatment;
the heat transfer member is provided so as to contact the gas adsorbing material in the housing container; and
at least a part of the heat transfer member is exposed from the gas adsorbing material in the housing container.

8. The gas adsorbing device according to claim 5, wherein the heat transfer member is made of metal.

9. The gas adsorbing device according to claim 8, wherein the heat transfer member is lower in emissivity than the container.

10. A vacuum insulation panel comprising at least:
a core material; and
the gas adsorbing device according to claim 1, wherein:
the core material and the gas adsorbing device are covered with a coating member having a gas barrier property; and
an inside of the coating member is reduced in pressure.

* * * * *